(12) United States Patent
Otomaru et al.

(10) Patent No.: US 10,268,918 B2
(45) Date of Patent: Apr. 23, 2019

(54) IMAGE PROCESSING APPARATUS AND METHOD FOR CALCULATING IMAGE DEFORMATION BETWEEN IMAGES

(71) Applicant: CANON KABUSHIKI KAISHA, Tokyo (JP)

(72) Inventors: Itaru Otomaru, Tokyo (JP); Kazuhiro Miyasa, Yokohama (JP); Ryo Ishikawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 17 days.

(21) Appl. No.: 14/943,204

(22) Filed: Nov. 17, 2015

(65) Prior Publication Data

US 2016/0148380 A1 May 26, 2016

(30) Foreign Application Priority Data

Nov. 20, 2014 (JP) ................................. 2014-235890

(51) Int. Cl.
*G06K 9/46* (2006.01)
*G06K 9/62* (2006.01)
*G06T 7/33* (2017.01)

(52) U.S. Cl.
CPC ......... *G06K 9/4638* (2013.01); *G06K 9/6206* (2013.01); *G06T 7/33* (2017.01);
(Continued)

(58) Field of Classification Search
None
See application file for complete search history.

(56) References Cited

U.S. PATENT DOCUMENTS 5,708,582 A * 1/1998 Ariizumi ............. G06F 17/5018
700/87
7,324,749 B2 * 1/2008 Kubo ................... H04N 1/6013
358/452

(Continued)

FOREIGN PATENT DOCUMENTS

JP 2011-142974 A 7/2011
JP 2013223674 A 10/2013

OTHER PUBLICATIONS

Rueckert et al., "Nonrigid Registration Using Free-Form Deformations: Application to Breast MR Images", IEEE Transactions on Medical Imaging, vol. 18, No. 8, Aug. 1999, pp. 712-721.
(Continued)

*Primary Examiner* — Michelle M Entezari
(74) *Attorney, Agent, or Firm* — Carter, DeLuca & Farrell LLP

(57) ABSTRACT

An image processing apparatus includes: an obtaining unit configured to obtain corresponding points group information for associating a position in an image captured in a first deformation state with a position in an image captured in a second deformation state; a calculation unit configured to calculate deformation from the image captured in the first deformation state to the image captured in the second deformation state based on the corresponding points group information; a display control unit configured to display, on a display unit, deformation progress information of an image based on the deformation calculated by the calculation unit; and a correction unit configured to correct the corresponding points group information. The calculation unit calculates the deformation based on the corresponding points group information corrected by the correction unit.

19 Claims, 11 Drawing Sheets

(52) U.S. Cl.
CPC .............. *G06K 2209/05* (2013.01); *G06T 2207/10072* (2013.01); *G06T 2207/30004* (2013.01)

(56) References Cited

U.S. PATENT DOCUMENTS

| | | | | |
|---|---|---|---|---|
| 8,446,526 B2* | 5/2013 | Furukawa | ............ | G09G 3/2025 348/452 |
| 8,554,573 B2* | 10/2013 | Pekar | ............ | G06Q 50/22 705/2 |
| 8,682,054 B2* | 3/2014 | Xue | ............ | G06T 7/33 382/131 |
| 8,824,762 B2* | 9/2014 | Rivaz | ............ | A61B 8/485 382/131 |
| 2001/0042825 A1* | 11/2001 | Young | ............ | H04N 5/217 250/252.1 |
| 2005/0078880 A1* | 4/2005 | Schroeder | ............ | G06T 3/0081 382/294 |
| 2006/0239530 A1* | 10/2006 | Oosawa | ............ | G06T 7/0012 382/130 |
| 2007/0179377 A1* | 8/2007 | Carlsen | ............ | G06T 3/0068 600/407 |
| 2007/0258643 A1* | 11/2007 | Lotjonen | ............ | G06K 9/00 382/173 |
| 2008/0136931 A1* | 6/2008 | Hatanaka | ............ | G03B 7/02 348/222.1 |
| 2008/0137934 A1* | 6/2008 | Sakaguchi | ............ | A61B 6/4441 382/132 |
| 2008/0317376 A1* | 12/2008 | Kasperkiewicz | ............ | G06T 5/00 382/274 |
| 2009/0172754 A1* | 7/2009 | Furukawa | ............ | H04N 5/765 725/91 |
| 2010/0074475 A1* | 3/2010 | Chouno | ............ | A61B 5/055 382/107 |
| 2010/0286995 A1* | 11/2010 | Pekar | ............ | G06Q 50/22 705/2 |
| 2011/0050889 A1* | 3/2011 | Kiuchi | ............ | G06T 1/20 348/135 |
| 2011/0081061 A1* | 4/2011 | Bell | ............ | G06T 7/35 382/130 |
| 2011/0142308 A1* | 6/2011 | Ishikawa | ............ | G06T 3/0093 382/128 |
| 2011/0194847 A1* | 8/2011 | Wakamatsu | ............ | G03B 5/00 396/55 |
| 2011/0286673 A1* | 11/2011 | Givon | ............ | G06T 7/194 382/199 |
| 2012/0300998 A1* | 11/2012 | Ioudovski | ............ | A61B 3/0025 382/128 |
| 2014/0023254 A1* | 1/2014 | Ishikawa | ............ | G06T 7/0012 382/131 |
| 2014/0085613 A1* | 3/2014 | Doyle | ............ | G03B 21/608 353/69 |
| 2014/0153797 A1* | 6/2014 | Wan | ............ | G06T 7/38 382/128 |
| 2014/0161334 A1* | 6/2014 | Wang | ............ | G06K 9/00362 382/131 |
| 2014/0369584 A1* | 12/2014 | Fan | ............ | A61B 6/501 382/131 |
| 2015/0089337 A1* | 3/2015 | Grady | ............ | G06T 19/00 715/202 |
| 2015/0150535 A1* | 6/2015 | Fan | ............ | A61B 8/485 600/438 |
| 2016/0048826 A1* | 2/2016 | Fefferman | ............ | G06Q 20/3274 705/23 |
| 2016/0148380 A1* | 5/2016 | Otomaru | ............ | G06K 9/4638 382/294 |

OTHER PUBLICATIONS

Japanese Office Action dated Jul. 13, 2018 for corresponding Japanese Patent Application No. JP 2014235890.

* cited by examiner

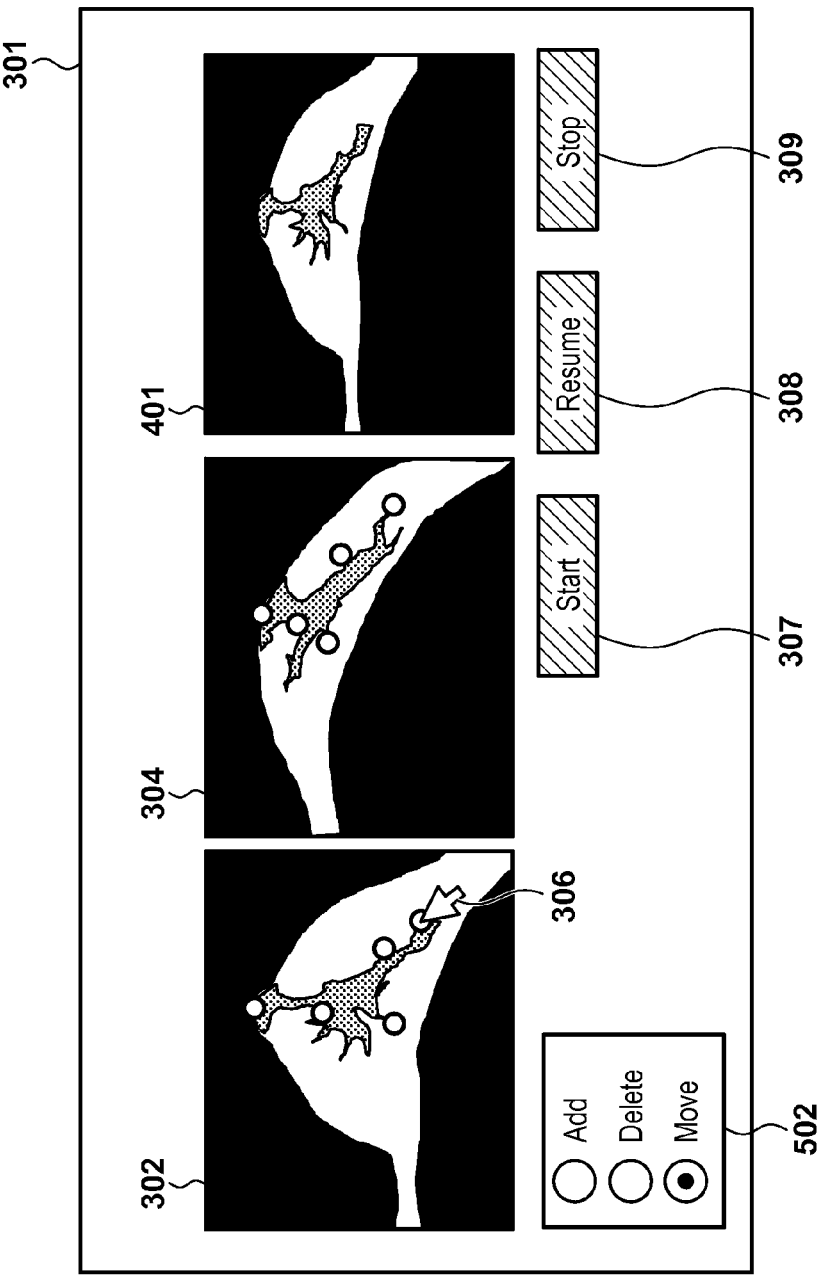

US 10,268,918 B2

IMAGE PROCESSING APPARATUS AND METHOD FOR CALCULATING IMAGE DEFORMATION BETWEEN IMAGES

BACKGROUND OF THE INVENTION

Field of the Invention

The present invention relates to an image processing technique of performing registration between images.

Description of the Related Art

In imaging diagnosis using medical images, a doctor performs diagnosis while comparing images captured by a plurality of image capturing apparatuses (modalities) and the like. Since, however, postures and shapes of an object differ between images, identification of a lesion region and comparison are difficult. Thus, registration between a plurality of images is attempted.

As a method of performing registration between a plurality of images, Japanese Patent Laid-Open No. 2011-142974 discloses a technique of manually providing a set of pieces of corresponding points information between images, and performs interactive registration by using the corresponding points group as constraints.

However, for example, a registration algorithm based on iterative calculation may require an enormous calculation cost (calculation amount). When such algorithm requiring an enormous calculation cost is used for registration, a long waiting time is needed every time a corresponding points group is set, thereby degrading the convenience.

The present invention has been made in consideration of the above problem, and provides an image processing technique capable of reducing a waiting time to obtain a registration result.

SUMMARY OF THE INVENTION

According to one aspect of the present invention, there is provided an image processing apparatus comprising: an obtaining unit configured to obtain corresponding points group information for associating a position in an image captured in a first deformation state with a position in an image captured in a second deformation state; a calculation unit configured to calculate deformation from the image captured in the first deformation state to the image captured in the second deformation state based on the corresponding points group information; a display control unit configured to display, on a display unit, deformation progress information of an image based on the deformation calculated by the calculation unit; and a correction unit configured to correct the corresponding points group information, wherein the calculation unit calculates the deformation based on the corresponding points group information corrected by the correction unit.

According to another aspect of the present invention, there is provided an image processing method, comprising the steps of: obtaining corresponding points group information for associating a position in an image captured in a first deformation state with a position in an image captured in a second deformation state; calculating deformation from the image captured in the first deformation state to the image captured in the second deformation state based on the corresponding points group information; displaying, on a display unit, deformation progress information of an image based on the deformation calculated in the step of calculating; correcting the corresponding points group information; and calculating the deformation based on the corrected corresponding points group information.

Further features of the present invention will become apparent from the following description of exemplary embodiments (with reference to the attached drawings).

BRIEF DESCRIPTION OF THE DRAWINGS

FIG. 5 is a view showing the screen arrangement of the display unit when the corresponding points group is corrected according to the first embodiment;

DESCRIPTION OF THE EMBODIMENTS

Figure 1:
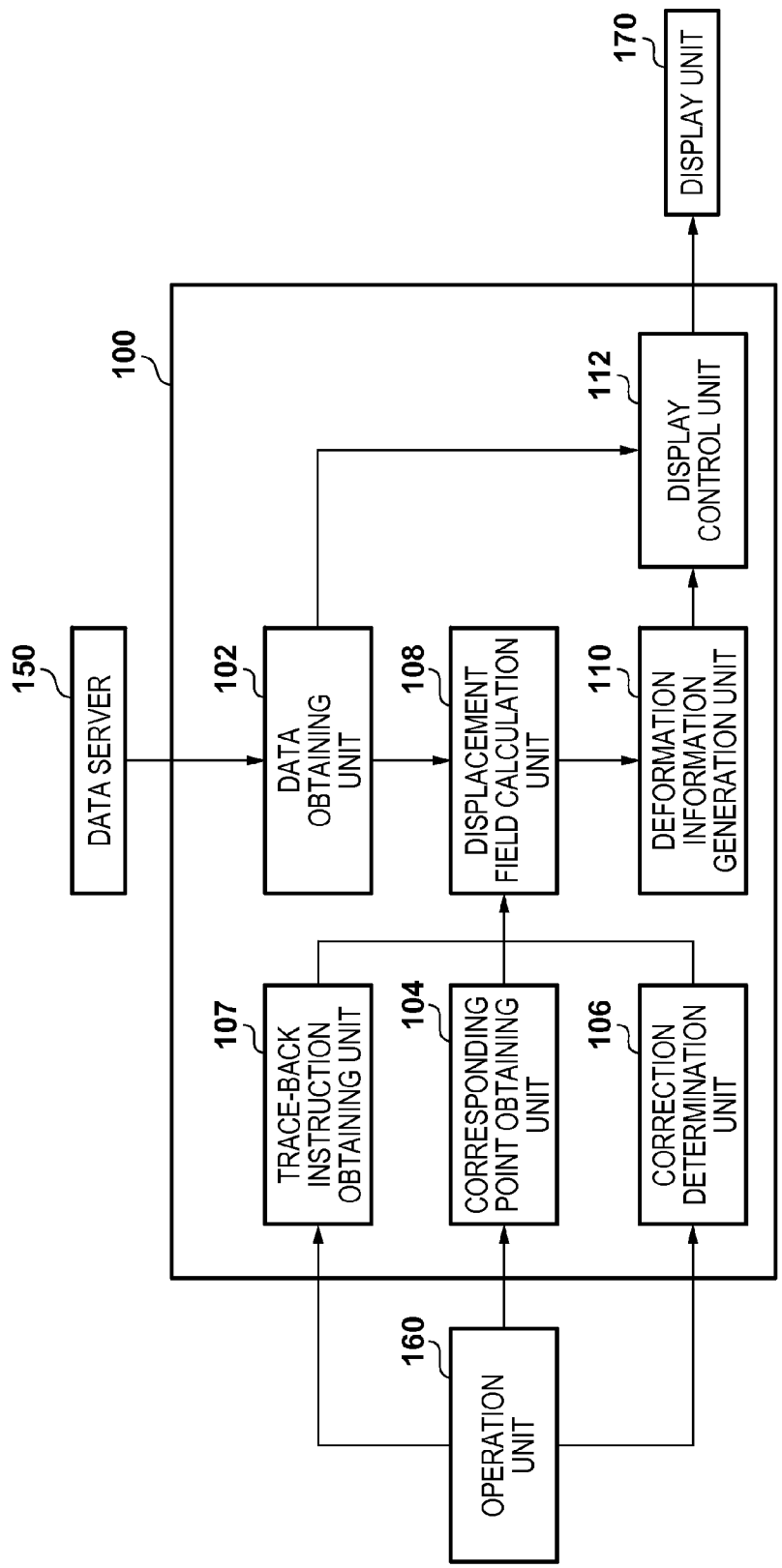
FIG. 1 is a block diagram showing the device configuration of an image processing apparatus according to the first embodiment.

Embodiments of the present invention will be exemplarily described in detail below with reference to the accompanying drawings. Note that components to be described in these embodiments are merely examples. The technical scope of the present invention is defined by the scope of the claims, and is not limited by the following embodiments.

<First Embodiment: Display of Halfway State During Optimization and Correction of Corresponding Points>

An image processing apparatus according to this embodiment performs registration between two images. The image processing apparatus calculates a displacement field (deformation) from an image captured in the first deformation state to an image captured in the second deformation state based on corresponding points group information for associating a position on the image captured in the first deformation state with a position on the image captured in the second deformation state. In the calculation processing of calculating the displacement field (deformation), the image processing apparatus displays deformation information (to be referred to as deformation progress information hereinafter) indicating a displacement field (to be referred to as a temporary displacement field hereinafter) corresponding to a temporary deformation state (to be referred to as a temporary state) for display different from a final displacement field (an optimized displacement field) (to be referred to as a final displacement field hereinafter). The deformation progress information indicates intermediate deformation information representing deformation in a calculation processing halfway state. Note that the deformation information (deformation progress information) indicating the displacement field (temporary displacement field) corresponding to the temporary deformation state (temporary state) is used to display a halfway state indicating a provisional displacement during optimization with respect to the final displacement field (optimized final displacement field). That is, the deformation progress information indicates deformation information (provisional deformation information) representing the displacement field (provisional displacement field) corresponding to the provisional deformation state (provisional state) during optimization.

This allows the user to correct corresponding points while seeing a provisional deformation result even during calculation of the final displacement field. In this embodiment, the intermediate deformation information indicating the displacement field (the displacement field during optimization) (to be referred to as an intermediate displacement field hereinafter) in a halfway state (intermediate state) indicating a provisional displacement during calculation processing for obtaining the final displacement field is displayed as the deformation progress information. While the user corrects the corresponding points, the calculation processing (optimization processing) of calculating the displacement field (deformation) is temporarily interrupted. Upon completion of correction, the corresponding points group information is updated, and the calculation processing (optimization processing) of calculating the displacement field (deformation) is restarted. The image processing apparatus performs registration between two images by executing the characteristic processing described above.

The "displacement field" indicates the correspondence between a specific position on the first image and a specific position on the second image. Assume that the displacement field calculation processing is performed under the constraints that the distance value of the corresponding points group between the images is minimized. The "corresponding points" indicate a pair of points of "a point of interest on the first image" and "a point corresponding to the point of interest on the second image". The "corresponding points group" indicates a set of corresponding points. "Correction of the corresponding points group" indicates performing one of addition of new corresponding points, deletion of arbitrary corresponding points, and movement of positions of arbitrary corresponding points with respect to the already inputted corresponding points group. The arrangement and processing of the image processing apparatus according to this embodiment will be described with reference to FIGS. 1 to 5.

FIG. 1 is a block diagram showing the configuration of an image processing system according to this embodiment. As shown in FIG. 1, an image processing apparatus 100 according to this embodiment is connected to a data server 150, an operation unit 160, and a display unit 170.

The first and second images held in the data server 150 are three-dimensional tomographic images respectively obtained by capturing in advance an object under different conditions (different modalities, imaging modes, dates/times, body postures, and the like). An image capturing apparatus (modality) for capturing a three-dimensional tomographic image can be, for example, an MRI apparatus, CT apparatus, three-dimensional ultrasonic imaging apparatus, photoacoustic tomography apparatus, a PET (Positron Emission Tomography)/SPECT (Single Photon Emission Computed Tomography), or OCT apparatus.

For example, the first and second images may be captured by different modalities in different imaging modes at almost the same time. Alternatively, the images may be those obtained by capturing the same patient by the same modality in the same body posture at different dates/times for follow-up observation. Note that the first and second images are formed as a set of two-dimensional tomographic images, and the position and posture of each of the two-dimensional tomographic images are converted into those in a reference coordinate system (a coordinate system in a space with reference to the object), and then held in the data server 150. The first and second images expressed by the reference coordinate system are input to the image processing apparatus 100 via a data obtaining unit 102.

The operation unit 160 accepts an operation of a mouse or keyboard by the user, and inputs corresponding points designated by the user to the image processing apparatus 100 via a corresponding point obtaining unit 104. During displacement field calculation processing, the operation unit 160 accepts an operation of a GUI by the user, and inputs, to the image processing apparatus 100 via a correction determination unit 106, determination information indicating whether to perform correction. Furthermore, the operation unit 160 accepts an operation of a GUI by the user, and inputs, to the image processing apparatus 100 via a trace-back instruction obtaining unit 107, an instruction indicating whether to trace back optimization processing steps.

The display unit 170 displays a display image generated by the image processing apparatus 100 and various kinds of information such as a halfway state during optimization. A GUI for obtaining an instruction from the user is also arranged in the display unit 170.

The image processing apparatus 100 is constituted by components to be described below. The data obtaining unit 102 obtains information of the first and second images input to the image processing apparatus 100. The first and second images are output to a displacement field calculation unit 108 and a display control unit 112.

The corresponding point obtaining unit 104 obtains corresponding points group information each of the corresponding points are a pair of points for associating a position in an image captured in the first deformation state with a position in an image captured in the second deformation state. For example, in accordance with a user instruction, the corresponding point obtaining unit 104 obtains corresponding points on the first and second images, and stores them in a storage unit (not shown). Furthermore, in accordance with a user instruction, the corresponding point obtaining unit 104 performs addition processing, deletion processing, or position change processing for the corresponding points group stored in the storage unit. The corresponding point obtaining unit 104 outputs the corresponding points group information stored in the storage unit to the displacement field calculation unit 108.

The correction determination unit 106 determines whether to correct the corresponding points group by interrupting optimization in the algorithm of the registration method currently executed. The correction determination unit 106 outputs, to the displacement field calculation unit 108, determination information indicating whether to perform correction.

The trace-back instruction obtaining unit 107 accepts a user instruction indicating whether to trace back the optimization processing steps in the algorithm of the registration method, and outputs it to the displacement field calculation unit 108. In the interrupted calculation processing, the trace-back instruction obtaining unit 107 obtains an instruction of the processing steps to be traced back. For example, after the trace-back instruction obtaining unit 107 instructs the processing steps to be traced back and correction of the corresponding points group information is completed, the displacement field calculation unit 108 restarts the calculation processing of calculating deformation from a processing step reached by tracing back the instructed processing steps based on the corrected corresponding points group information.

The displacement field calculation unit 108 calculates the displacement field (deformation) from the image captured in the first deformation state to the image captured in the second deformation state based on the corresponding points group information. The displacement field calculation unit 108 calculates the displacement field for deforming the first image to register it with the second image by using the corresponding points group information as constraints. The displacement field calculation unit 108 executes displacement field calculation processing based on, for example, iterative optimization using a steepest descent method. Every time one step in iterative optimization is completed, the displacement field calculation unit 108 outputs information about an intermediate displacement field at this time to a deformation information generation unit 110. Similarly, when iterative optimization satisfies an end condition to complete the displacement field calculation processing, the displacement field calculation unit 108 outputs information of the optimized final displacement field to the deformation information generation unit 110. Furthermore, the displacement field calculation unit 108 accepts, from the correction determination unit 106, determination information indicating whether to perform correction. When it is determined to perform correction, the displacement field calculation unit 108 interrupts the displacement field calculation processing. For example, when correcting the corresponding points group information via a correction unit (the corresponding point obtaining unit 104 and a GUI 502), the displacement field calculation unit 108 interrupts the calculation processing of calculating the displacement field (deformation) in accordance with an operation input for instructing to interrupt the calculation processing of calculating the displacement field (deformation). Upon completion of correction by the correction unit (corresponding point obtaining unit 104 and GUI 502), the displacement field calculation unit 108 restarts the calculation processing of calculating the displacement field (deformation) based on the corrected corresponding points group information.

The deformation information generation unit 110 obtains a calculation result indicating a deformation halfway state from the displacement field calculation unit 108, and generates deformation progress information. The deformation information generation unit 110 obtains a deformation calculation result (intermediate displacement field and final displacement field) from the displacement field calculation unit 108, generates information (to be referred to as deformation information hereinafter) for display, and outputs the generated deformation information to the display control unit 112.

The display control unit 112 displays, on the display unit 170, the generated deformation progress information (deformation progress information (intermediate deformation information) indicating the deformation halfway state) of the image based on the deformation. The display control unit 112 performs display control to display, on the display unit 170, cross-sectional images of the first and second images obtained from the data obtaining unit 102, and the deformation information obtained from the deformation information generation unit 110.

The correction unit (corresponding point obtaining unit 104 and GUI 502) corrects the corresponding points group information based on an operation input by the user, and the displacement field calculation unit 108 calculates the displacement field (deformation) based on the corrected corresponding points group information and the deformation progress information (intermediate deformation information).

Figure 2:
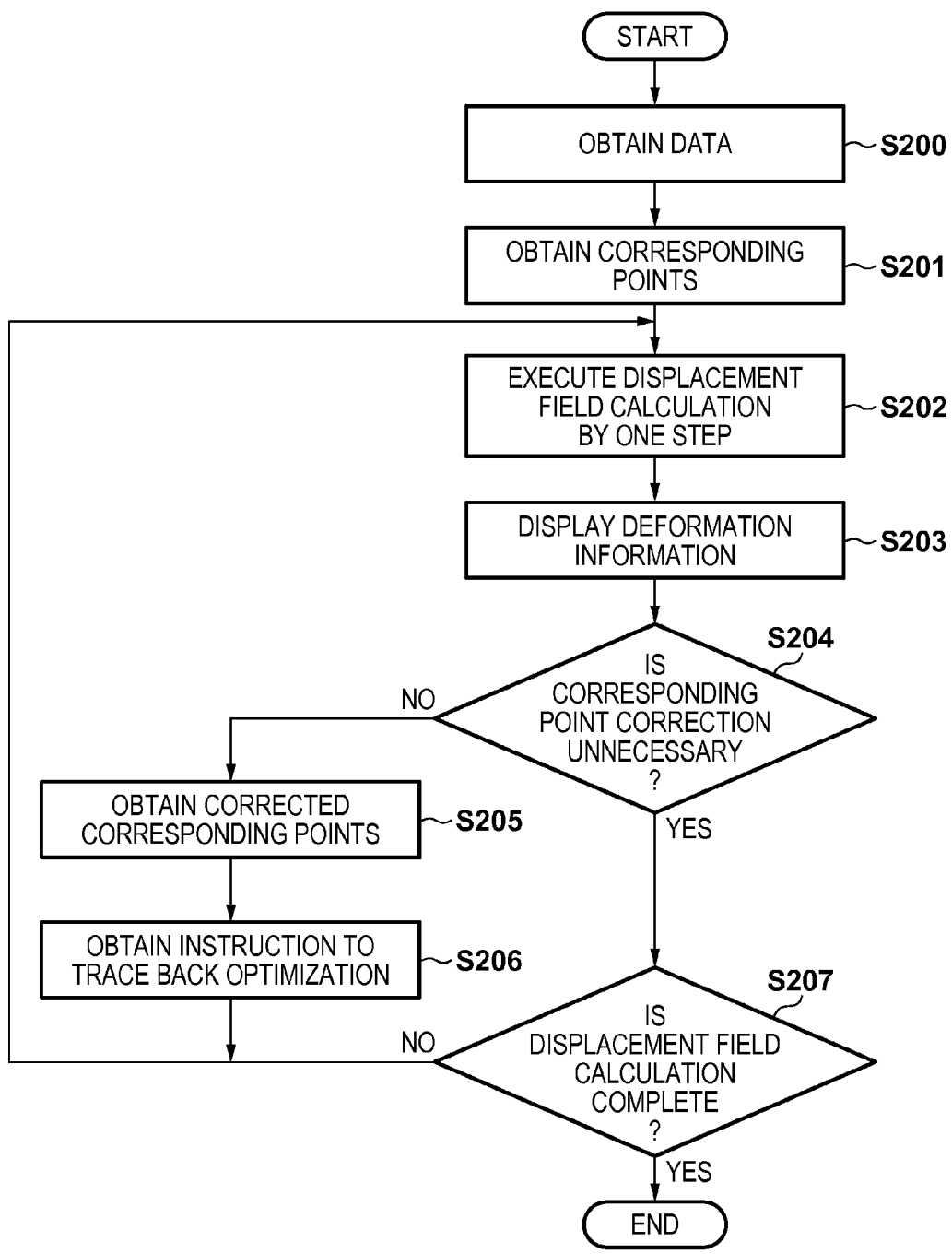
FIG. 2 is a flowchart illustrating an overall processing procedure according to the first embodiment.

FIG. 2 is a flowchart illustrating an overall processing procedure performed by the image processing apparatus 100.

(Obtaining of Data: S200)

In step S200, the data obtaining unit 102 obtains the first and second images from the data server 150. Note that when the data server 150 holds information of corresponding points between the first and second images, the data obtaining unit 102 obtains the information, and stores it as corresponding points group information in the storage unit (not shown).

(Obtaining of Corresponding Points: S201)

Figure 3:
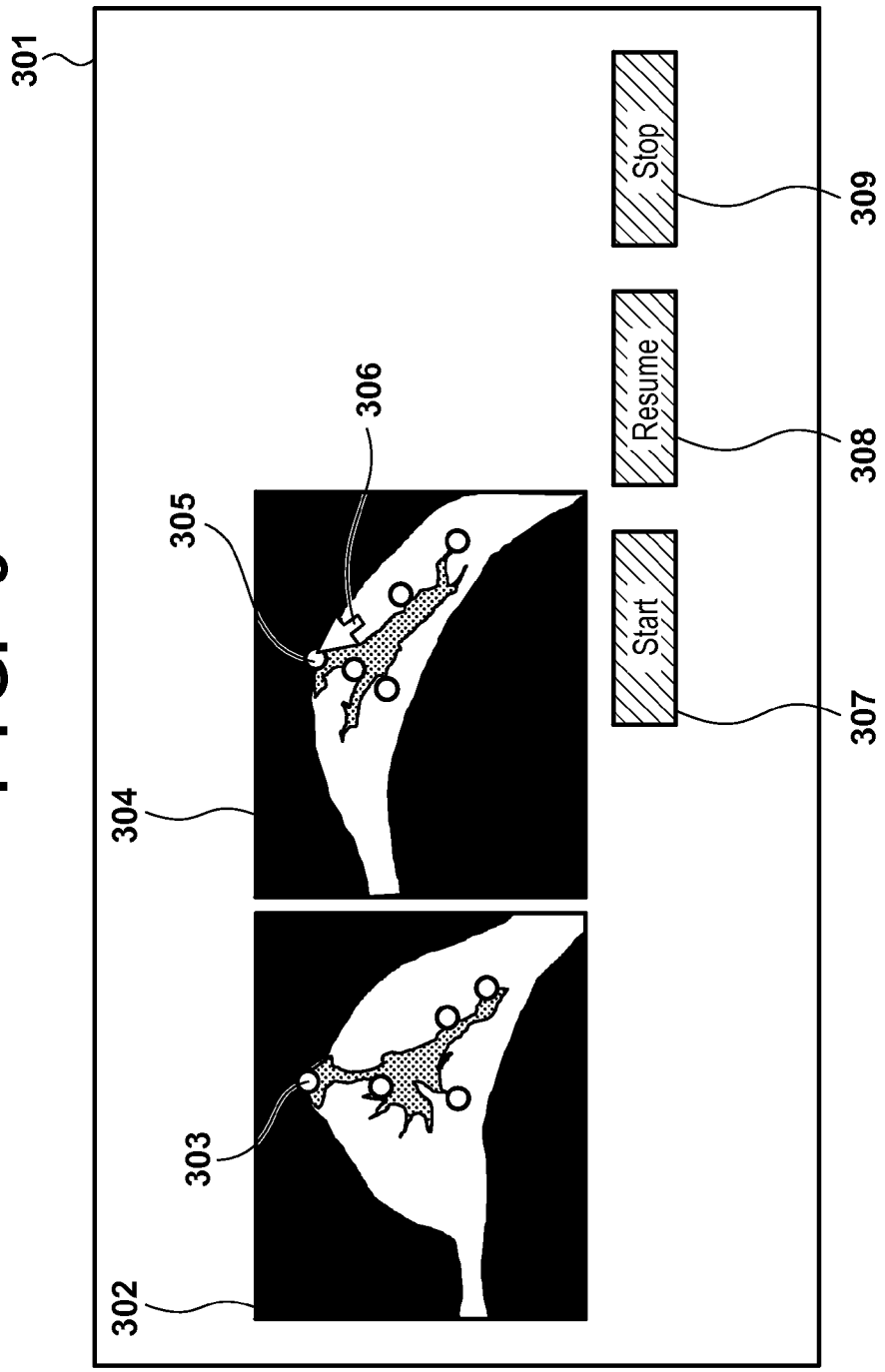
FIG. 3 is a view showing the screen arrangement of a display unit when a corresponding points group is input according to the first embodiment.

In step S201, the corresponding point obtaining unit 104 obtains corresponding points between the first and second images in accordance with a user instruction. FIG. 3 shows an example of the display unit 170 when obtaining corresponding points. The display control unit 112 generates predetermined cross-sectional images from the first and second images, respectively, in accordance with a user instruction, and displays them as a first cross-sectional image 302 and a second cross-sectional image 304 on a display screen 301 of the display unit 170. The user operates a mouse cursor 306 to click a characteristic position on the first cross-sectional image 302, thereby inputting it as a point of interest. A corresponding point 303 on the first image shown in FIG. 3 is an example of the point of interest. By using a mammary gland MRI image as an example, the "characteristic position" indicates, for example, a nipple position, a blood vessel branch position, the position of a projection at a mammary fat boundary, or the like.

After that, the user operates the mouse cursor 306 in the same manner, and clicks, on the second cross-sectional image 304, a position corresponding to the corresponding point 303 on the first image. A corresponding point 305 on the second image shown in FIG. 3 corresponds to the point. In this way, the corresponding points (a pair of corresponding points on both the images) are input. The corresponding point obtaining unit 104 obtains information (a pair of coordinates of corresponding points on the first and second images) of the corresponding points input by the user in this way, and adds the information to the corresponding points group information held in the storage unit (not shown). After the user finishes inputting a plurality of corresponding points, when the corresponding point obtaining unit 104 accepts pressing of a registration start button 307, the image processing apparatus 100 advances the process to the next step.

Note that the above operation method is merely an example, and arbitrary operation method for implementing input of corresponding points may be used. Alternatively, an arrangement may be adopted in which corresponding point candidates are automatically extracted by image feature point extraction processing such as an interest operator and the user selects corresponding points from them.

Referring to FIG. 3, in addition to the registration start button 307, a registration interrupt button 309 for instructing to interrupt the calculation processing and a registration restart button 308 for instructing to restart the interrupted calculation processing are displayed as a GUI. The registration start button 307, registration restart button 308, and registration interrupt button 309 are displayed on the display screen 301 of the display unit 170 based on display control of the display control unit 112.

When the correction unit (corresponding point obtaining unit 104 and GUI 502) performs correction, the displacement field calculation unit 108 interrupts the calculation processing of calculating the displacement field (deformation) in accordance with an operation input of the registration interrupt button 309 for instructing to interrupt the calculation processing. After completion of correction by the correction unit (corresponding point obtaining unit 104 and GUI 502), in accordance with an operation input of the registration restart button 308 for instructing to restart the interrupted calculation processing, the displacement field calculation unit 108 restarts the calculation processing of calculating the displacement field (deformation) based on the corrected corresponding points group information.

(Execution of Displacement Field Calculation by One Step: S202)

In step S202, the displacement field calculation unit 108 calculates the displacement field for deforming the first image to register it with the second image based on the corresponding points group information obtained in step S201 or S205 (to be described later). As described above, the displacement field calculation processing is performed based on iterative optimization in which at least the sum of displacement values between corresponding points is used to obtain a cost value. At this time, in step S202, only calculation for one step of iterative optimization is performed. Assuming that the current step is a kth step and the next step to be obtained is a (k+1)th step, the displacement field calculation unit 108 executes the displacement field calculation (update) processing based on the steepest descent method by one step by:

$$x^{k+1} = x^k - \alpha \text{grad}(f(x^k)) \quad (1)$$

where x represents a parameter indicating a displacement field, $f(x^k)$ represents a function of obtaining a cost value when the displacement field parameter is represented by $x^k$, grad represents a function of obtaining a gradient, and α represents a weighted coefficient for adjusting the update amount of the displacement field parameter. This calculation processing indicates that the parameter is updated in a direction in which the first derivative of the cost function $f(x^k)$ becomes largest. The cost function f(x) is given by:

$$f(x) = \frac{1}{N} \times \sum_{i=1}^{N} \|p'_{1i} - p_{2i}\| \quad (2)$$

where N represents the number of corresponding points in a corresponding points group, $p'_{1i}$ represents the coordinate value of a corresponding point obtained by applying the displacement field parameter $x^k$ to an ith corresponding point $p_{1i}$ on the first image, and $p_{2i}$ represents a vector indicating the coordinate value of an ith corresponding point on the second image. This calculation processing indicates that the average value of the distance values between the corresponding points is set as a cost. Note that any known cost function based on corresponding points other than the cost function indicated by equation (2) may be used as the cost function f(x). For example, instead of the function that sets only a data term indicated by equation (2) as a cost, a function including a regularization term for evaluating the smoothness of deformation or the like may be used. Note that the displacement field is specifically represented using a known method such as FFD (Free-Form Deformation) based on interpolation of a B-spline function.

When the corresponding points group is corrected in step S205 (to be described later), the displacement field calculation unit 108 updates the cost function indicated by equation (2) based on the corrected information every time, and calculates the displacement field based on the updated cost function. Note that the displacement field calculation unit 108 directly uses, as the displacement field parameter $x^k$, the value obtained using the corresponding points group before correction (the displacement field parameter obtained by the last processing in step S202). Even during the displacement field calculation processing, the displacement field calculation unit 108 can reflect the corrected corresponding points group information to the displacement field calculation processing.

Note that the displacement field calculation unit 108 can perform the processing to advance optimization by a predetermined number of steps instead of one step. Alternatively, the displacement field calculation unit 108 can perform the processing to advance optimization by the number of steps executable within a predetermined time. If a displacement field calculation method is a method performed via predetermined processing stages, the displacement field calculation unit 108 can perform the processing to advance optimization until processing at each stage ends. For example, the displacement field calculation unit 108 can apply, as a displacement field calculation method, a method by Rueckert and the like disclosed in a literature (D. Rueckert, L. Sonoda, C. Hayes, D. Hill, M. Leach, and D. Hawkes, "Nonrigid registration using free-form deformations: application to breast MR images", IEEE med. imag., vol. 18(8), pp. 712-721, 1999). The method by Rueckert and the like is based on a coarse-to-fine concept in which overall displacement field calculation is performed by setting the coarse mesh spacing of FFD at the first stage of optimization, and local calculation is performed by gradually decreasing the mesh spacing. To cope with the coarse-to-fine concept, for each process in this step, the displacement field calculation unit 108 can perform calculation until the optimization processing for each mesh spacing converges. An algorithm used for iterative optimization is not limited to the steepest descent method, and the displacement field calculation unit 108 can use another optimization algorithm such as a conjugate gradient method, quasi-Newton method, or Powell method. The displacement field calculation unit 108 stores the displacement field (that is, $x^{k+1}$) calculated in the above processing in the storage unit (not shown).

(Display of Deformation Information: S203)

In step S203, the deformation information generation unit 110 generates (updates) the deformation information (deformation progress information) based on the displacement field calculated in step S202. The deformation information generation unit 110 displays the generated deformation information on the display unit 170 via the display control unit 112.

Figure 4A:
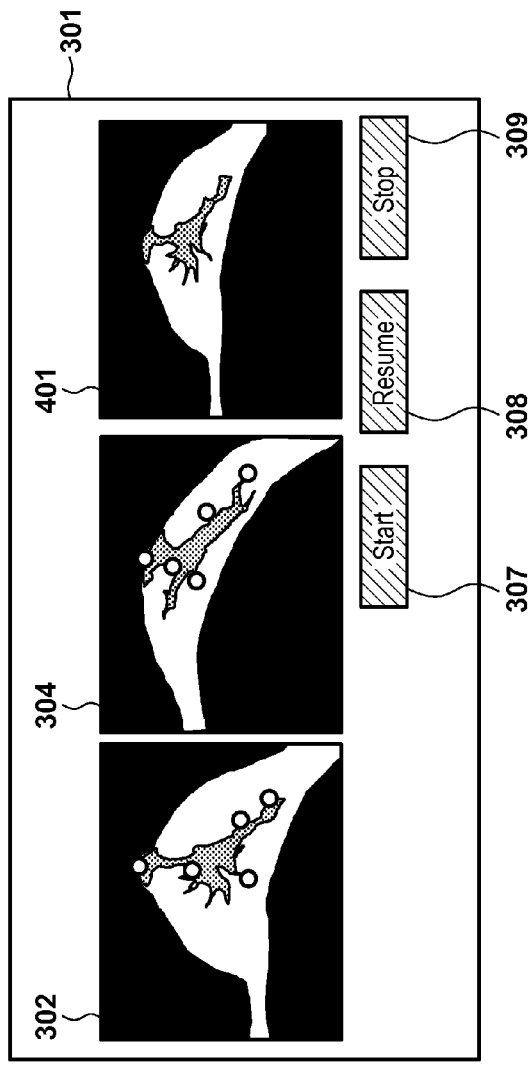
FIGS. 4A to 4C are views showing the screen arrangement of the display unit when a deformation state is displayed according to the first embodiment.

The deformation information displayed in this step is, for example, a deformed image obtained by deforming the first image using the current displacement field. FIG. 4A is a view showing a display example of the deformation information. The user can determine the degree of appropriateness of the deformation at this time by comparing the second cross-sectional image 304 and a cross-sectional image 401 of the deformed image.

Figure 4B:
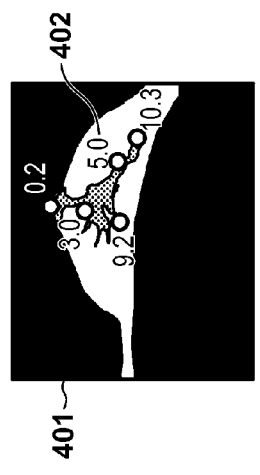

Note that the displayed deformation information is not limited to the above-described deformed image. For example, a cost value used to calculate a displacement field may be visualized. FIG. 4B is a view showing a display example by overlaying, on the cross-sectional image of the deformed image, a mark (○ in FIG. 4B) representing the position (a position obtained by deforming each corresponding point on the first image by $x^{k+1}$) of each corresponding point on the deformed image and character information 402 representing the distance error (a residual after deformation by $x^{k+1}$) of each corresponding point on the section.

In a region near a corresponding point whose distance error is small, optimization has already converged, and even if the step advances, the region is not deformed largely any more at high probability. Therefore, if deformation near the region is inappropriate, the user can determine that correction is necessary. On the other hand, in a region near a corresponding point whose distance error is large, the distance error has not converged yet, and even if deformation is inappropriate at this time, the user can determine that succeeding optimization may improve the deformation.

Note that a case in which the distance error of each corresponding point is displayed as character information by display control of the display control unit 112 has been exemplified in this embodiment. However, another display method may be adopted. For example, the display control unit 112 can display each distance error to visualize it by the color of each corresponding point. In addition, the display control unit 112 can display a movement locus to indicate how an arbitrary position on the image moved by optimization until now.

Figure 4C:

FIG. 4C is a view showing an example in which a locus 403 of a position at which the image is sampled at a predetermined interval is overlaid and displayed on the cross-sectional image of the deformed image. Display of the movement locus shown in FIG. 4C is used to predict, based on the movement locus from the start of sampling until now, a direction in which the sampling position moves by succeeding optimization at high probability. If, for example, it is predicted that inappropriate deformation is obtained at high probability, the user can determine that correction is necessary. Note that with respect to the sampling position, the display control unit 112 can display the locus of the position when the optimization step is sampled at a predetermined interval. This allows the user to grasp the degree of convergence of a change in position of the sampling point, and estimate a position to which the position will move by deformation. Note that the display control unit 112 can not only display the intermediate displacement field (intermediate deformation information) shown in each of FIGS. 4A, 4B, and 4C as one piece of information but also display a plurality of pieces of information side by side or overlay and display a plurality of pieces of information.

In this embodiment, a case in which the displacement field calculation unit 108 executes the displacement field calculation processing to update the deformation information for every step has been exemplified. However, the result of the displacement field calculation processing need not be updated for every step. The displacement field calculation unit 108 can update the displacement field for every predetermined number of steps (for example, every 10 steps) (does not update the displacement field in other steps). Alternatively, the displacement field calculation unit 108 can update the displacement field by a latest displacement field for every predetermined time. Furthermore, if the displacement field calculation method is a method performed via predetermined processing stages, the displacement field calculation unit 108 may be configured to update the displacement field every time processing at each stage ends, based on the above-described coarse-to-fine approach.

If the user determines that it is necessary to correct the corresponding points group, he/she can instruct to interrupt the displacement field calculation processing by pressing the registration interrupt button 309 shown in FIG. 4A. Upon pressing of the interrupt button 309, the image processing apparatus 100 advances the process to step S204. If the user has executed no operation of observing the deformation information (no operation of switching the section of the cross-sectional image or the like) in step S203 for a predetermined period or more, the image processing apparatus 100 advances the process to step S204. Alternatively, if a predetermined time elapses after the process transits from step S202 to step S203, the image processing apparatus 100 advances the process to step S204.

(Determination of Presence/Absence of Corresponding Point Correction: S204)

In step S204, in accordance with the presence/absence of pressing of the interrupt button 309, the correction determination unit 106 interrupts the current displacement field calculation processing, and determines whether to correct the corresponding points group. If it is determined to correct the corresponding points (NO in step S204), the correction determination unit 106 advances the process to step S205. On the other hand, if it is determined not to correct the corresponding points (YES in step S204), the correction determination unit 106 advances the process to step S207.

(Obtaining of Corrected Corresponding Points: S205)

In step S205, in accordance with a user instruction, the corresponding point obtaining unit 104 obtains and corrects the corresponding points group information stored in the storage unit (not shown). This processing updates the corresponding points group information used for the displacement field calculation processing. The corresponding point obtaining unit 104 outputs the updated corresponding points group information to the displacement field calculation unit 108. The corresponding point obtaining unit 104 and the GUI 502 shown in FIG. 5 function as the correction unit for correcting the corresponding points group information based on an operation input.

FIG. 5 is a view showing a display example when the corresponding points group is corrected. The user designates an "Add", "Delete", or "Move" operation to be performed, by using the GUI 502 for selecting a corresponding point correction method. After that, the user corrects the corresponding points group by operating the mouse cursor 306. When performing the "Add" operation, the user designates corresponding positions on the first cross-sectional image 302 and the second cross-sectional image 304, similarly to the operation in step S201. When performing the "Delete" operation, the user designates a corresponding point to be deleted in one of the cross-sectional images, and then executes deletion processing by, for example, operating the keyboard. When performing the "Move" operation, the user designates a corresponding point to be moved in one of the cross-sectional images, and then moves the point by dragging a mouse pointer. The corresponding point obtaining unit 104 obtains information for correcting the corresponding points input by the user in this way, and modifies (adds, deletes, or changes) the corresponding points group information held in the storage unit (not shown) in accordance with the obtained corresponding point information. After the user completes correction of the corresponding points, when pressing of the registration restart button 308 is accepted, the image processing apparatus 100 advances the process to step S206.

Note that the above-described operation method is merely an example, and an arrangement using an arbitrary operation method of implementing the above operation may be adopted. Furthermore, in this embodiment, a case in which the corresponding point obtaining unit 104 corrects the corresponding points with reference to the first cross-sectional image 302 and the second cross-sectional image 304 has been exemplified. The present invention is not limited to this. For example, the corresponding point obtaining unit 104 can also correct the corresponding points with reference to the second cross-sectional image 304 and the cross-sectional image 401 of the deformed image obtained by deforming the first image. This produces an effect that it is possible to input a corresponding point on an image (cross-sectional image 401) closer to the second image than the first cross-sectional image 302.

(Obtaining of Instruction to Trace Back Optimization: S206)

In step S206, the trace-back instruction obtaining unit 107 obtains a user instruction indicating whether to trace back the optimization processing steps, and how many processing steps are to be traced back. By providing, in the display unit 170, a GUI for designating whether to trace back the optimization processing steps and how many processing steps are to be traced back, this function is implemented based on an instruction obtained via the GUI. The trace-back instruction obtaining unit 107 obtains information indicating the number of steps by which the optimization processing is to be traced back, and transmits the information to the displacement field calculation unit 108, thereby advancing the process to step S202. When executing the processing in step S202 next, the displacement field calculation unit 108 restarts the displacement field calculation processing from the step reached by tracing back the processing steps (by reading out the displacement field in the step from the storage unit). With this processing, even if the displacement field calculation processing has converged in an inappropriate state, and it is determined that it is impossible to correct the displacement field only by adding/deleting/moving the corresponding points group in the current deformation state, it is possible to correct the result of the displacement field calculation processing without redoing the displacement field calculation processing from the beginning.

(Determination of Completion of Displacement Field Calculation Processing: S207)

In step S207, the displacement field calculation unit 108 determines whether all the steps in iterative calculation of the displacement field calculation processing are complete. For example, if a decrease in cost value by calculation for one step of the displacement field calculation processing executed in step S202 is smaller than a threshold, the displacement field calculation unit 108 determines that the displacement field calculation processing is complete (YES in step S207), the processing of the image processing apparatus 100 ends. If the cost value hardly decreases by repeatedly performing calculation, the optimization processing has converged and the displacement field calculation processing is complete at high probability. In this case, the displacement field calculation unit 108 determines that the displacement field calculation processing is complete, and the processing of the image processing apparatus 100 ends.

On the other hand, a decrease in cost value is equal to or larger than the threshold, the displacement field calculation unit 108 determines that the displacement field calculation processing is incomplete (NO in step S207), and returns the process to step S202 to continue the displacement field calculation processing.

Note that determination of the end condition may be performed by another method. For example, a repetition count may be determined in advance, and when iterative calculation is executed by the repetition count, completion of the displacement field calculation processing may be absolutely determined. Alternatively, the threshold of the cost may be determined in advance, and when the cost value becomes smaller than the threshold as a result of optimization, completion of the displacement field calculation processing may be determined. Furthermore, the displacement field may be continuously updated without any restriction until an end instruction is obtained from the user.

At the end of the processing in this step, input (correction) of the corresponding point group information has ended. Consequently, by using the confirmed corresponding point group information, the displacement field calculation unit 108 can execute, in the initial state, the optimization processing of estimating the displacement field. In this case, the displacement field obtained in this processing is saved in the storage unit (not shown) together with the displacement field calculated in step S202. With these processes, the final displacement field is saved in the storage unit (not shown), and the display control unit 112 displays the deformation information generated from the final displacement field on the display unit 170.

Alternatively, without waiting for determination of completion of all the steps in iterative calculation of the displacement field calculation processing, it is possible to execute, in the initial state, the optimization processing of estimating the displacement field every time input (correction) of the corresponding point group information is updated. In this case, the displacement field calculation unit 108 performs, as background processing, the aforementioned optimization processing executed in parallel to the main processing described in step S202. If background processing based on the last corrected corresponding point group information is in progress, the displacement field calculation unit 108 stops the background processing, and starts background processing based on new corresponding point group information. In this case, a displacement field obtained by the background processing is saved in the storage unit (not shown) together with the displacement field calculated by the main processing.

According to this embodiment, even if an algorithm in which it takes time to perform the displacement field calculation processing is adopted, it is possible to correct the corresponding point group without executing the displacement field calculation processing to the end. Since the halfway state during optimization is displayed, and the user can correct the corresponding points during the displacement field calculation processing, even if an algorithm that requires time is used as a registration method, it is possible to reduce a waiting time to obtain a registration result.

<Second Embodiment: Additional Use of High-Speed Algorithm for Displaying Deformation Information>

In the first embodiment, the deformation information displayed in step S203 is generated from the displacement field during optimization, which is calculated for every step in step S202. Unlike the first embodiment, an image processing apparatus according to this embodiment has as its feature to generate deformation progress information from a displacement field and display it by setting, as a temporary state of deformation, a state in which optimization has converged by additionally using an algorithm (to be referred to as a high-speed algorithm hereinafter) whose accuracy is lower than that of an algorithm used for optimization but which operates at high speed.

Only the difference from the first embodiment will described below. Note that the functional arrangement of an image processing apparatus 100 according to this embodiment is the same as that shown in FIG. 1, and the function of a displacement field calculation unit 108 and that of a deformation information generation unit 110 are partially different from those shown in FIG. 1.

The displacement field calculation unit 108 executes processing of calculating a displacement field (deformation) using, in combination, an algorithm of calculating a displacement field (deformation) and a high-speed algorithm capable of performing processing at higher speed than the algorithm. A display control unit 112 obtains deformation information based on the processing of the high-speed algorithm as deformation progress information (intermediate deformation information), and displays the information on a display unit 170. The displacement field calculation unit 108 obtains deformation progress information by applying the high-speed algorithm to a calculation result representing the halfway state of the algorithm of calculating deformation.

An overall processing procedure executed by the image processing apparatus according to this embodiment is the same as that shown in FIG. 2 except for processing contents in steps S202 and S203. Processing executed by the displacement field calculation unit 108 in step S202 and processing executed by the deformation information generation unit 110 in step S203 will be described below.

(Execution of Displacement Field Calculation by One Step: S202)

In step S202, the displacement field calculation unit 108 calculates a displacement field for deforming the first image to register it with the second image based on corresponding point group information, similarly to the processing in step S202 according to the first embodiment. The displacement field calculation unit 108 performs calculation for one step of iterative optimization by using at least the sum of distance values between corresponding points to obtain a cost value. That is, similarly to the first embodiment, a displacement field parameter $x^k$ obtained by the last processing in step S202 is updated to calculate an updated displacement field parameter $x^{k+1}$.

Furthermore, as processing different from that in the first embodiment, the displacement field calculation unit 108 according to this embodiment further executes processing of calculating a displacement field that cancels the residual of each corresponding point by $x^{k+1}$ by the high-speed algorithm by using, as an initial value, the displacement field parameter $x^{k+1}$ calculated in the above processing. Assume that a displacement field parameter calculated by the displacement field calculation unit 108 using the high-speed algorithm is represented by $x'^{k+1}$. The displacement field calculation unit 108 stores, in a storage unit (not shown), the displacement field parameter $x^{k+1}$ calculated by the same processing as that in the first embodiment, and the displacement field parameter $x'^{k+1}$ calculated by the high-speed algorithm. Note that in the processing in step S202 to be executed next, the displacement field calculation unit 108 performs optimization by setting, as the current state, the displacement field parameter $x^{k+1}$ calculated by the same processing as that in the first embodiment instead of the displacement field parameter $x'^{k+1}$ calculated by the high-speed algorithm. In the processing in step S202 to be executed next, the displacement field calculation unit 108 updates the displacement field parameter $x^{k+1}$ to calculate an updated displacement field parameter $x^{k+2}$.

Note that the displacement field calculation unit 108 can use, for example, a radial basis function (RBF) as the high-speed algorithm. In this case, the displacement field calculation unit 108 can express a cost between corresponding points by simultaneous equations using the RBF, and calculate the displacement field by linear calculation without performing iterative optimization. In addition, the displacement field calculation unit 108 can use, as the high-speed algorithm, FFD (Free-Form Deformation) in which a coarse mesh spacing is set.

(Display of Deformation Information: S203)

In step S203, the deformation information generation unit 110 generates (updates) the deformation information (deformation progress information) from the displacement field parameter $x'^{k+1}$ calculated in step S202. The processing is the same as that in step S203 according to the first embodiment except that the displacement field parameter $x'^{k+1}$ is used instead of $x^{k+1}$. The deformation information generation unit 110 displays the generated deformation information on the display unit 170 via the display control unit 112.

Note that the deformation information generation unit 110 can display, on the display unit 170 via the display control unit 112, the pieces of deformation information respectively generated from the displacement field parameters $x^{k+1}$ and $x'^{k+1}$ side by side. In addition, the deformation information generation unit 110 can display a GUI on the display unit 170 via the display control unit 112. The user can select, via the GUI, one of the pieces of deformation information generated from the displacement field parameters $x^{k+1}$ and $x'^{k+1}$ to be displayed. The deformation information generation unit 110 displays the deformation information on the display unit 170 via the display control unit 112 based on the user selection input via the GUI.

According to this embodiment, since the corresponding point group can be corrected with reference to a displacement field which is estimated with low accuracy by the high-speed algorithm but for which optimization has converged, instead of a displacement field in an optimization halfway state, it is possible to obtain an effect that a region to be corrected is quickly and readily determined in a region of an image.

<Third Embodiment: Displacement Field Calculation Processing by Background Operation During Corresponding Point Correction>

In the first embodiment, the displacement field calculation processing is temporarily stopped while the corresponding point group information is corrected, and restarts upon completion of corresponding point group correction. An image processing apparatus according to this embodiment has as its feature to continuously calculate a displacement field and display the calculated displacement field even while a corresponding point group is corrected.

Only the difference from the first embodiment will be described below. Note that the function arrangement of the image processing apparatus according to this embodiment is the same as that shown in FIG. 1 but no correction determination unit 106 or trace-back instruction obtaining unit 107 exists. In addition, the function of a corresponding point obtaining unit 104 and that of a deformation information generation unit 110 are partially different from those in the first embodiment. In this embodiment, while correction information for correcting corresponding point group information is input, a displacement field calculation unit 108 performs deformation calculation processing in the background. Furthermore, while the correction information for correcting the corresponding point group information is input, a display control unit 112 obtains deformation information indicating a deformation halfway state in the background, and displays it on a display unit 170.

Figure 6:
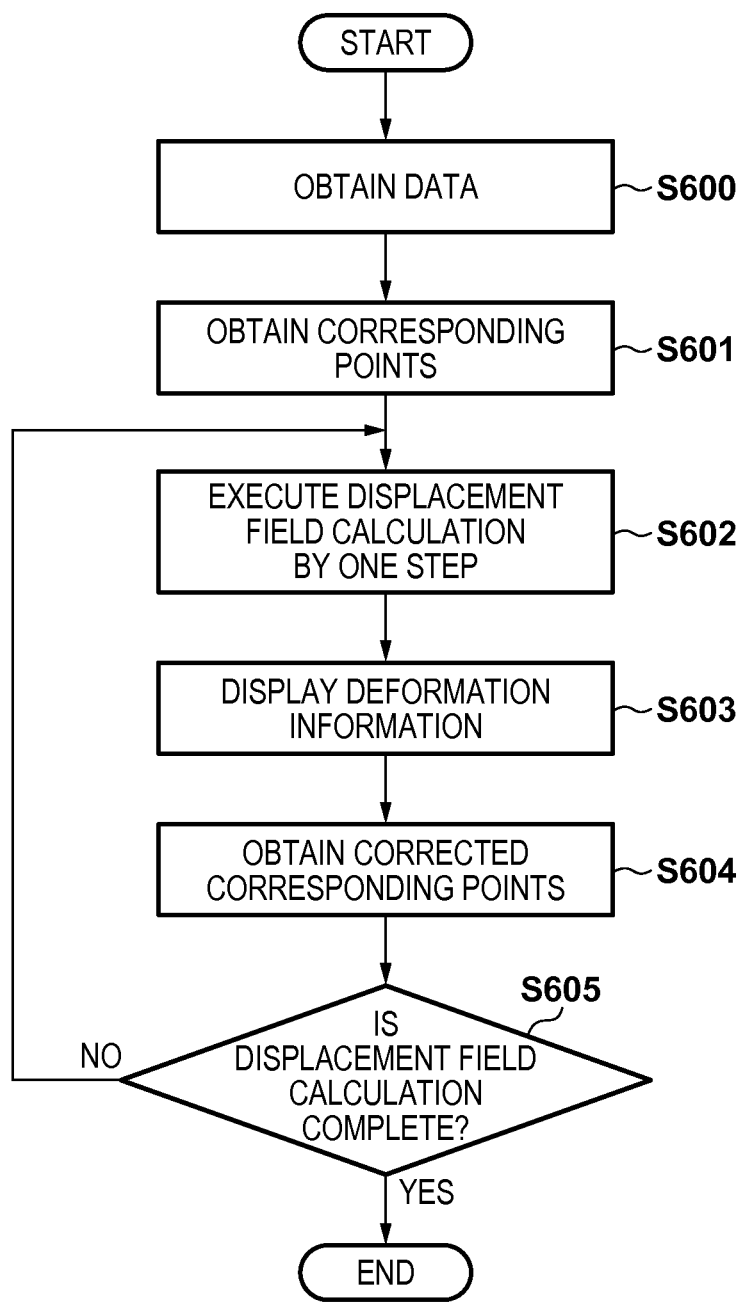
FIG. 6 is a flowchart illustrating an overall processing procedure according to the third embodiment.

FIG. 6 is a flowchart illustrating an overall processing procedure executed by the image processing apparatus according to this embodiment. Note that processes in steps S600, S601, S602, and S605 are the same as those in step S200, S201, S202, and S207 according to the first embodiment, respectively, and a description thereof will be omitted.

(Display of Deformation Information: S603)

In step S603, if the status of the processing satisfies a predetermined condition, the deformation information generation unit 110 updates deformation information based on a displacement field calculated in step S602. If an instruction to update the deformation information is obtained from the user, the deformation information generation unit 110 generates deformation information to be used for display based on the latest displacement field; otherwise, the last updated deformation information is held as deformation information to be used for display. The deformation information to be used for display is displayed on the display unit 170 via the display control unit 112. The generated deformation information and a display method are the same as those in the first embodiment.

Note that another condition may be used as a condition under which the deformation information is updated. For example, the deformation information generation unit 110 can update the deformation information at a predetermined time interval (based on the latest displacement field at this time). If corresponding point group information is updated in processing in step S604 (to be described later), the deformation information generation unit 110 can update the deformation information in the immediately succeeding processing in this step. A case in which no user operation (neither switching of a display section nor correction of corresponding points) has been executed for a predetermined period or more may be used as an update condition. The deformation information generation unit 110 can update the deformation information every time processes of a predetermined number of steps are executed. The user may be able to select one of these update conditions, as a matter of course.

Note that the image processing apparatus according to this embodiment immediately advances the process to the next step (step S604) without waiting for an instruction from the user or determining an operation status by the user, unlike the processing in step S203 according to the first embodiment.

(Obtaining of Corrected Corresponding Points: S604)

In step S604, in accordance with a user instruction, the corresponding point obtaining unit 104 obtains and corrects corresponding point group information stored in a storage unit (not shown). With this processing, the corresponding point group information used for displacement field calculation processing is updated. The corresponding point obtaining unit 104 outputs the updated corresponding point group information to the displacement field calculation unit 108. The processing executed by the corresponding point obtaining unit 104 in this step is equivalent to acceptance of the result of inputting point group correction information by the user and correction of the corresponding point group information based on the result. That is, the user performs an operation of inputting the correction information for correcting the corresponding point group information, and the process immediately advances to the next step (step S605) before the input result is obtained. In step S605, the displacement field calculation unit 108 determines whether all steps in iterative calculation of the displacement field calculation processing are complete. If the displacement field calculation unit 108 determines that all the steps are complete, the process ends (YES in step S605); otherwise, the process returns to step S602 to repeat the same processing (NO in step S605).

With the above processing, displacement field calculation in step S602 and deformation state display in step S603 are continuously executed independently of observation of a cross-sectional image and input of corresponding points (step S604) by the user. That is, even while the user performs an operation of inputting the correction information for correcting the corresponding point group information, the displacement field calculation processing is performed in the background, and the deformation state display reflecting the result is updated. According to this embodiment, even while the corresponding point group information is corrected, the displacement field calculation processing is not interrupted, thereby making it possible to reduce the calculation time.

Note that in this embodiment, processing in which displacement field calculation and deformation state display are continuously executed while an operation of inputting the correction information for correcting the corresponding point group information is performed has been exemplified. The present invention is not limited to this. For example, the display control unit 112 can control display of the deformation state so as not to update display of the deformation state while the corresponding point group information is corrected. While the correction information for correcting the corresponding point group information is input, the display control unit 112 can stop updating display based on the obtained deformation information.

By performing such display control, it is possible to avoid a situation in which the correspondence between corresponding points to be input at start of correction of a corresponding point group becomes unclear when display of the deformation state is continuously updated. When inputting the correction information for correcting the corresponding points group information, the user can perform an operation of inputting the correction information for correcting the corresponding points group information while confirming display of the deformation state in which the correspondence of the corresponding points group is maintained.

The display control unit 112 can perform display control by setting only part (partial region) of the entire image as an update stop target, instead of stopping update of display of the deformation state of the entire image. The display control unit 112 stops update of display based on the obtained deformation information with respect to a partial region designated to correct the corresponding point groups information, obtains deformation information indicating a deformation halfway state with respect to a region other than the designated partial region, and displays the deformation information on the display unit. The display control unit 112 performs display control to update display of the deformation state. In this case, the display control unit 112 can perform display control by setting only a currently displayed section as an update stop target or setting, as an update stop target, only a region near a position designated by a mouse cursor or a partial region designated by a mouse cursor in the entire image. For example, the display control unit 112 can stop update of display based on the obtained deformation information with respect to a partial region designated to correct the corresponding points group information, obtain deformation information indicating a deformation halfway state with respect to a region other than the designated partial region, and display the deformation information on the display unit 170.

By performing such display control, with respect to a partial region in which the user is to correct a corresponding points group, the display control unit 112 stops update of display of the deformation state. The user can perform an operation of inputting the correction information for correcting the corresponding points group information while confirming display of the deformation state of the partial region in which the correspondence of the corresponding points group is maintained. Furthermore, with respect to a region other than the partial region, in which correction of the corresponding points group is not intended, the result of updating the deformation state can be quickly presented to the user by updating display of the deformation state.

<Fourth Embodiment: Combined Use of Two Displacement Field Calculation Algorithms>

In the first embodiment, one algorithm is used to calculate a displacement field. On the other hand, an image processing apparatus according to this embodiment has as its feature to use a low-accuracy, high-speed algorithm (to be referred to as a high-speed algorithm hereinafter) and a high-accuracy, low-speed algorithm (to be referred to as a low-speed algorithm hereinafter) in combination. When correcting corresponding points, a displacement field is calculated using the high-speed algorithm before updating corrected corresponding points group by the displacement field calculation processing of the low-speed algorithm, thereby making it possible to roughly confirm how the calculated displacement field changes by correction. This can obtain, based on the high-speed algorithm whose accuracy is low but whose processing speed is high, determination of a convergence state when the corresponding points group is corrected. An image processing apparatus 100 according to this embodiment will be described below with reference to only the difference from the first embodiment. An image processing system and the functional arrangement of the image processing apparatus according to this embodiment are the same as those shown in FIG. 1. A displacement field calculation unit 108 of the image processing apparatus 100 according to this embodiment calculates a displacement field using two kinds of algorithms: the high-speed and low-speed algorithms. The displacement field calculation unit 108 can execute processing of calculating deformation using the low-speed algorithm of calculating deformation and the high-speed algorithm which has the calculation processing accuracy lower than that of the low-speed algorithm and can perform calculation processing at high speed.

In this embodiment, the displacement field calculation unit 108 calculates a displacement field (deformation) using the high-speed algorithm, and a display control unit 112 obtains deformation information based on the processing of the high-speed algorithm as deformation progress information, and displays it on a display unit 170. If a correction unit (a corresponding point obtaining unit 104 and a GUI 502) does not correct corresponding points group information based on display of the display unit 170, the displacement field calculation unit 108 calculates a displacement field (deformation) using the low-speed algorithm. The display control unit 112 obtains deformation progress information (intermediate deformation information) based on the processing of the low-speed algorithm, and displays it on the display unit 170. If the correction unit (corresponding point obtaining unit 104 and GUI 502) corrects the corresponding points group information based on display of the display unit 170, the displacement field calculation unit 108 calculates deformation using the high-speed algorithm by setting the calculation result of the low-speed algorithm as an initial value. A processing procedure executed by the image processing apparatus 100 according to this embodiment will be described in detail with reference to a flowchart shown in FIG. 7.

Figure 7:
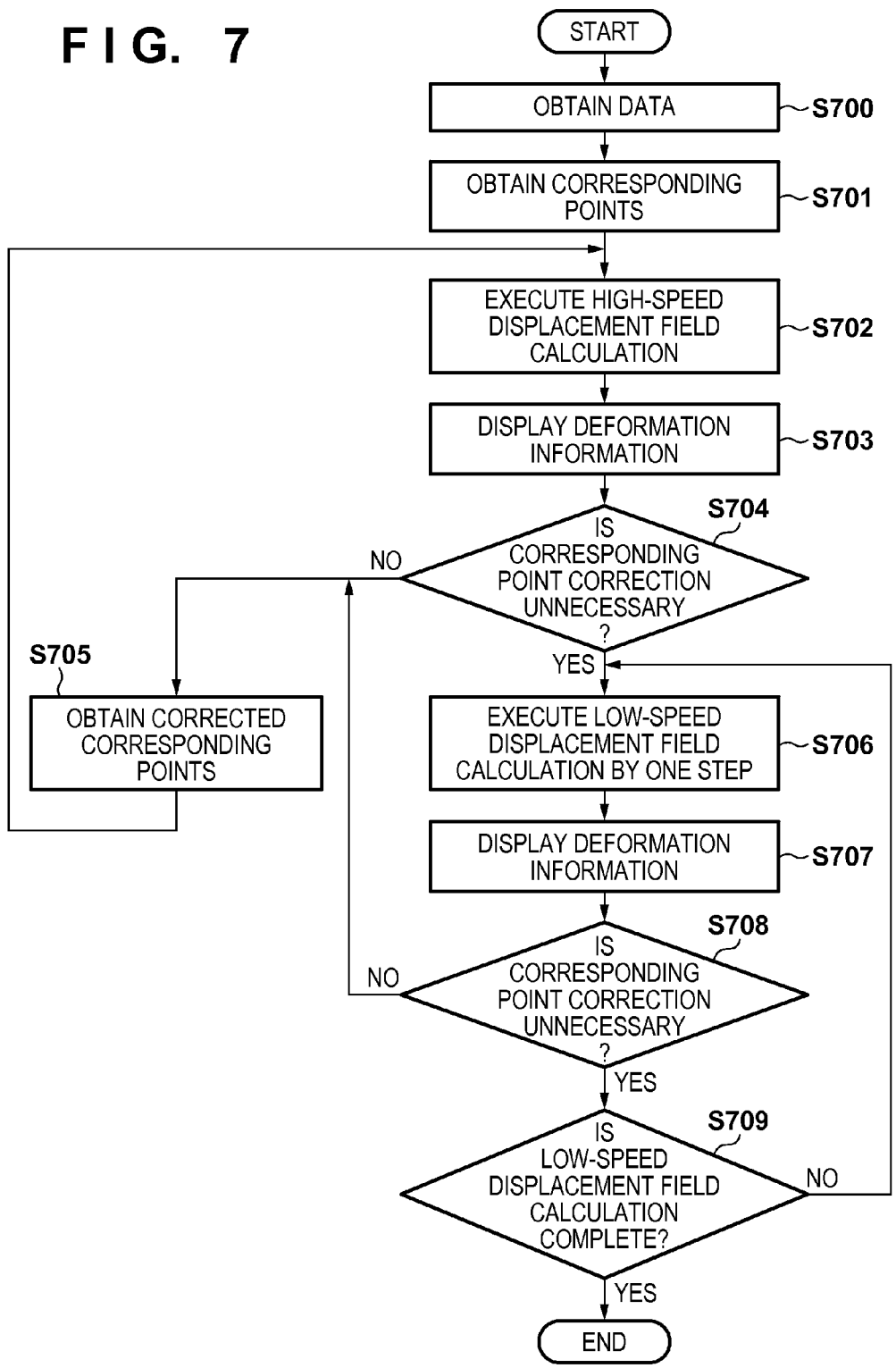
FIG. 7 is a flowchart illustrating an overall processing procedure according to the fourth embodiment.

FIG. 7 is a flowchart illustrating the overall processing procedure executed by the image processing apparatus 100. Note that processes in steps S700, S701, S703, S705, S707, and S708 are the same as those in steps S200, S201, S203, S205, S203 and S204 in FIG. 2 according to the first embodiment, respectively, and a description thereof will be omitted.

(Execution of High-Speed Displacement Field Calculation: S702)

In step S702, the displacement field calculation unit 108 executes displacement field calculation processing using the high-speed algorithm. Unlike step S202 according to the first embodiment, in this step, the displacement field calculation unit 108 executes the displacement field calculation processing to the end using the high-speed algorithm. The end condition of the displacement field calculation processing is the same as in step S207 according to the first embodiment. The displacement field calculation unit 108 can use, as the high-speed algorithm, one of the high-speed algorithms described in the second embodiment.

Note that when this step is executed via the processes in steps S706 to S708 and S705, the displacement field calculation processing is performed in this step using the high-speed algorithm by setting, as an initial value, a displacement field calculated by the low-speed algorithm in step S706. This makes it possible to obtain, by the displacement field calculation processing of the high-speed algorithm, a temporary final deformation state indicating how the deformation state finally changes with reference to the current intermediate deformation state.

(Determination of Presence/Absence of Corresponding Point Correction: S704)

In step S704, upon accepting an instruction from the user, the correction determination unit 106 determines whether to terminate the high-speed displacement field calculation processing and transit to execution of the low-speed displacement field calculation processing. In step S204 according to the first embodiment, if no instruction is accepted from the user, when a predetermined condition is satisfied, it is determined that "corresponding point correction is unnecessary". In this embodiment, the image processing apparatus 100 waits for input of an instruction from the user. The display control unit 112 displays a GUI for accepting input of an instruction from the user on the display unit 170. For example, the display control unit 112 displays a GUI (dialog box) with two buttons "Yes" and "No" on the display unit 170. If the correction determination unit 106 determines that "corresponding point correction is unnecessary" (YES in step S704), the process advances to step S706. On the other hand, if the correction determination unit 106 determines that "corresponding point correction is necessary" (NO in step S704), the process advances to step S705. Note that the correction determination unit 106 waits for a predetermined time instead of waiting for input of a user instruction. If no instruction is input during the waiting time, the correction determination unit 106 can determine that "corresponding point correction is unnecessary" (YES in step S704).

(Execution of Low-Speed Displacement Field Calculation by One Step: S706)

In step S706, the displacement field calculation unit 108 executes the displacement field calculation processing by one step using the low-speed algorithm. This processing is the same as that in step S202 according to the first embodiment except that the low-speed algorithm is used as a displacement field calculation algorithm. As an example of the low-speed algorithm, the displacement field calculation unit 108 can perform the displacement field calculation processing using an algorithm in which a fine mesh spacing is applied to the method by Rueckert and the like described in step S202 according to the first embodiment.

(Determination of Completion of Low-Speed Displacement Field Calculation Processing: S709)

In step S709, the displacement field calculation unit 108 determines whether all steps in iterative calculation of the displacement field calculation processing using the low-speed algorithm are complete. This processing is the same as that in step S207 according to the first embodiment except that the low-speed algorithm is used for the displacement field calculation processing. If the displacement field calculation unit 108 determines that the displacement field calculation processing is complete (YES in step S709), the processing of the image processing apparatus 100 ends. On the other hand, if the displacement field calculation unit 108 determines that the displacement field calculation processing is incomplete (NO in step S709), it returns the process to step S706 to continue the displacement field calculation processing using the low-speed algorithm.

According to this embodiment, when correcting a corresponding points group, it is possible to readily confirm, by using the high-speed displacement field calculation algorithm, how a displacement field changes by correction.

<Fifth Embodiment: Prediction and Display of Progress Status>

In the above embodiments, completion of the displacement field calculation processing is determined when the decrease amount or absolute value of the cost value becomes smaller than the predetermined threshold. On the other hand, an image processing apparatus according to this embodiment has as its main feature to predict the current degree of progress of displacement field (deformation) calculation processing (optimization processing) with respect to all the steps of the processing and display it on a display unit. This provides information for determining whether it is necessary to correct a corresponding points group.

Figure 8:
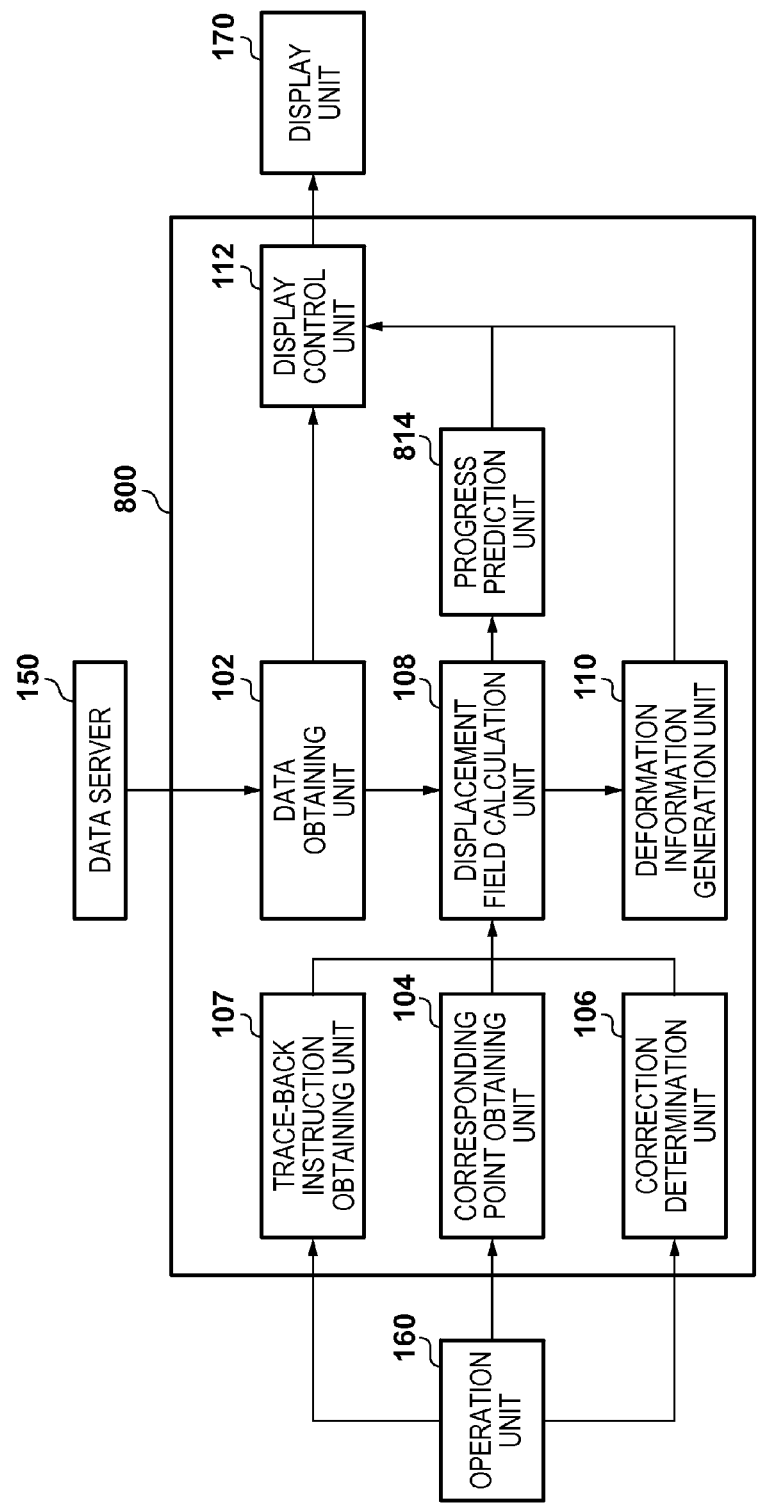
FIG. 8 is a block diagram showing the device configuration of an image processing apparatus according to the fifth embodiment.

FIG. 8 shows the arrangement of an image processing apparatus 800 according to this embodiment. Note that the same reference numerals as those in FIG. 1 denote the same parts and a description thereof will be omitted. A progress prediction unit 814 obtains, as progress information, the ratio of the number of steps having undergone calculation processing to the total number of steps to be executed by a displacement field calculation unit 108 to calculate a displacement field (deformation). That is, the progress prediction unit 814 obtains a cost value calculated by the displacement field calculation unit 108, and predicts the current degree of progress with respect to all the optimization steps. A display control unit 112 displays deformation progress information and the prediction result (progress information) of the progress prediction unit 814 on a display unit 170.

Figure 9:
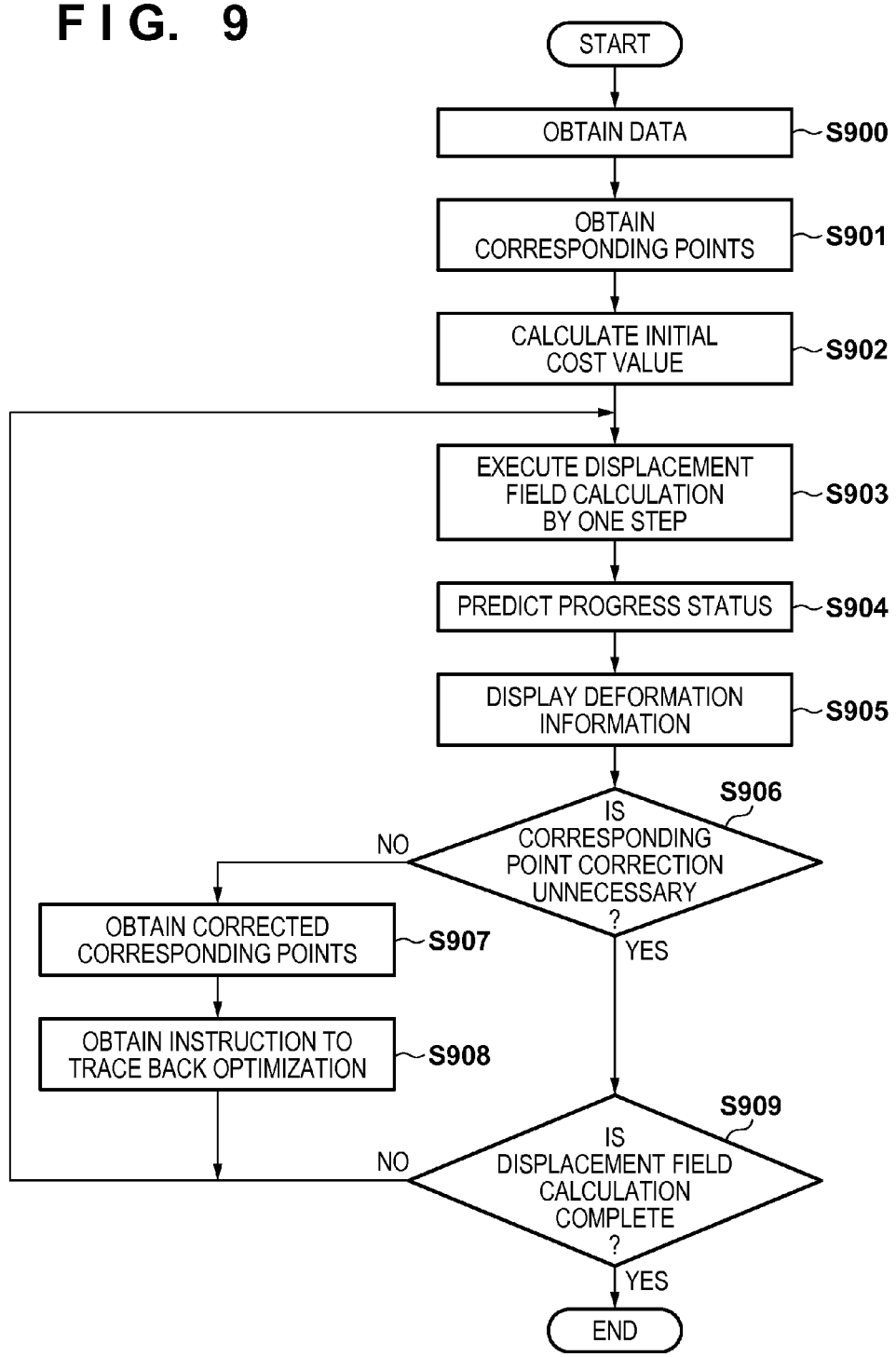
FIG. 9 is a flowchart illustrating an overall processing procedure according to the fifth embodiment.

FIG. 9 is a flowchart illustrating an overall processing procedure executed by the image processing apparatus 800. Note that processes in steps S900, S901, S903, and S906 to S909 are the same as those in steps S200, S201, S202, and S204 to S207 according to the first embodiment, respectively, and a description thereof will be omitted.

(Calculation of Initial Cost Value: S902)

In step S902, prior to displacement field calculation processing, the displacement field calculation unit 108 calculates a cost value (initial cost value) in a state before the displacement field calculation processing. The displacement field calculation unit 108 calculates a cost value using equation (2). The displacement field calculation unit 108 stores the calculated initial cost value in a storage unit (not shown).

(Prediction of Progress Status: S904)

In step S904, the progress prediction unit 814 obtains, as progress information, the ratio of the number of steps having undergone calculation processing to the total number of steps to be executed by the displacement field calculation unit 108 to calculate deformation. That is, the progress prediction unit 814 predicts a progress status with respect to all the optimization steps based on the current cost value. The progress prediction unit 814 predicts a progress status based on a cost value convergence prediction model prepared in advance.

Figure 10:
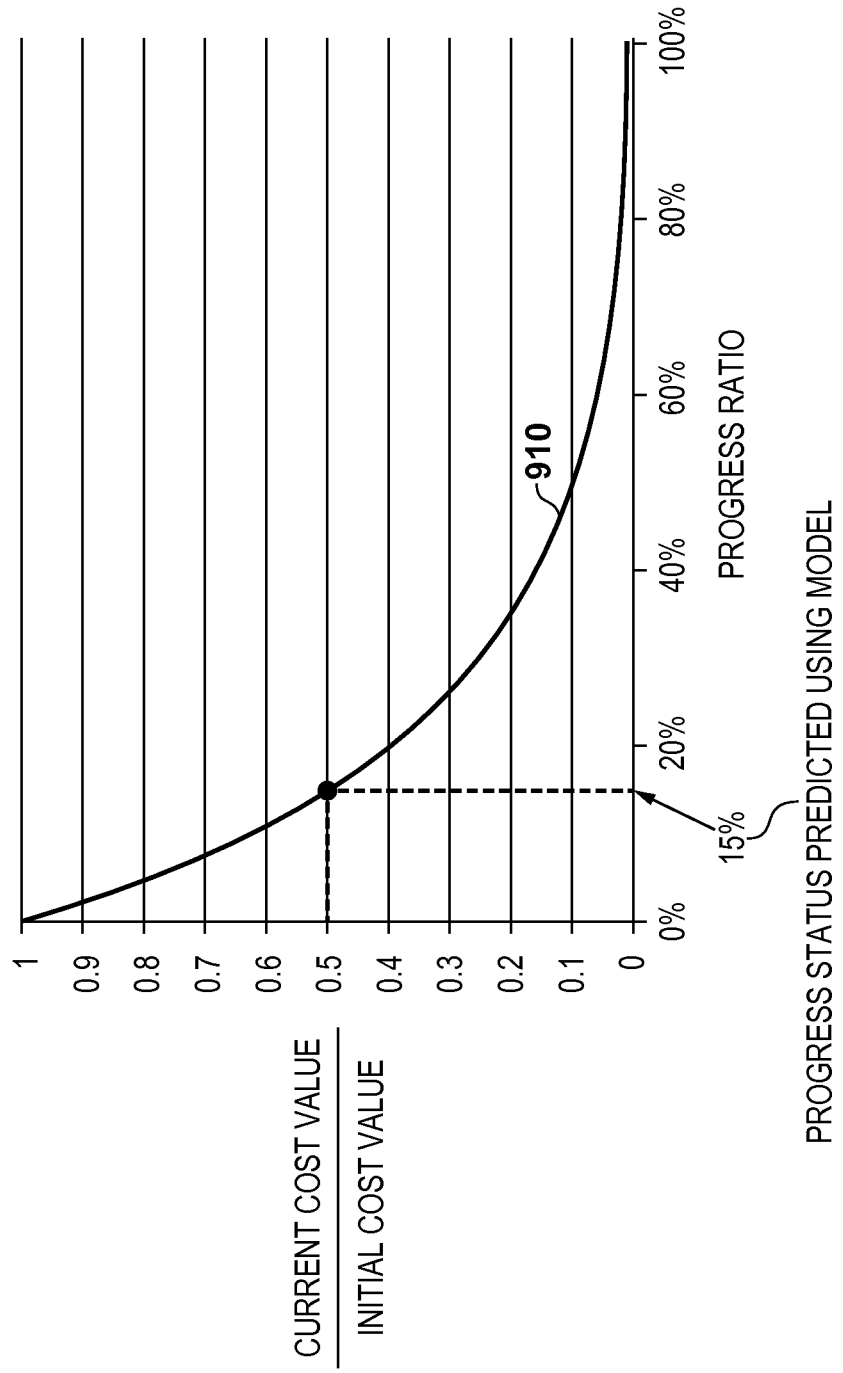
FIG. 10 is a graph showing a cost value convergence prediction model according to the fifth embodiment.

FIG. 10 is a graph showing the above-described cost value convergence prediction model, and an example of progress status prediction using the model. A cost value convergence prediction model 910 expresses the relationship between the ratio (progress ratio) indicating the progress status and the current cost value (the number of steps having undergone calculation processing) with respect to the initial cost value (the total number of steps to be executed to calculate deformation) before the displacement field calculation processing, given by:

$$y = a^x \qquad (3)$$

where x represents the ratio ($0 \leq x \leq 1$) indicating the progress status, y represents the ratio ($0 \leq y \leq 1$) of the current cost value to the initial cost value, and a represents a parameter for controlling the convergence speed. FIG. 10 shows a case in which a=0.01.

The progress prediction unit 814 predicts the progress status in accordance with the following procedure. Based on the calculation results in steps S902 and S903, the progress prediction unit 814 calculates the ratio of the current cost value to the initial cost value. The progress prediction unit 814 obtains x by substituting the calculated ratio (=current cost value/initial cost value) into y in equation (3). FIG. 10 shows a calculation result obtained when the ratio (=current cost value/initial cost value) is 0.5. The progress prediction unit 814 obtains the ratio (progress information) x≈0.15 (15%) indicating the progress status by substituting y=0.5 and a=0.01 into equation (3).

Note that this embodiment has exemplified a case in which a cost value convergence prediction model is expressed by a function of a simple form indicated by equation (3) for the sake of simplicity. In fact, however, the progress prediction unit 814 can analytically obtain a cost value convergence prediction model based on cost value convergence statuses in past cases. In this case, for a plurality of past cases, the progress prediction unit 814 can plot the relationship between the progress ratio (the number of optimization steps at a given point of time/the final number of optimization steps) and the cost value ratio, and use the average curve as a model. As compared with a case in which prediction is performed based on the simple function shown in FIG. 10, the progress prediction unit 814 can calculate a progress prediction result more accurately by analytically obtaining the progress ratio based on cost value convergence statuses in past cases.

(Display of Deformation Information: S905)

In step S905, the display control unit 112 controls to display the progress status prediction result calculated in step S904 on the display unit 170 in addition to display of the deformation information described in step S203 according to the first embodiment.

Figure 11:
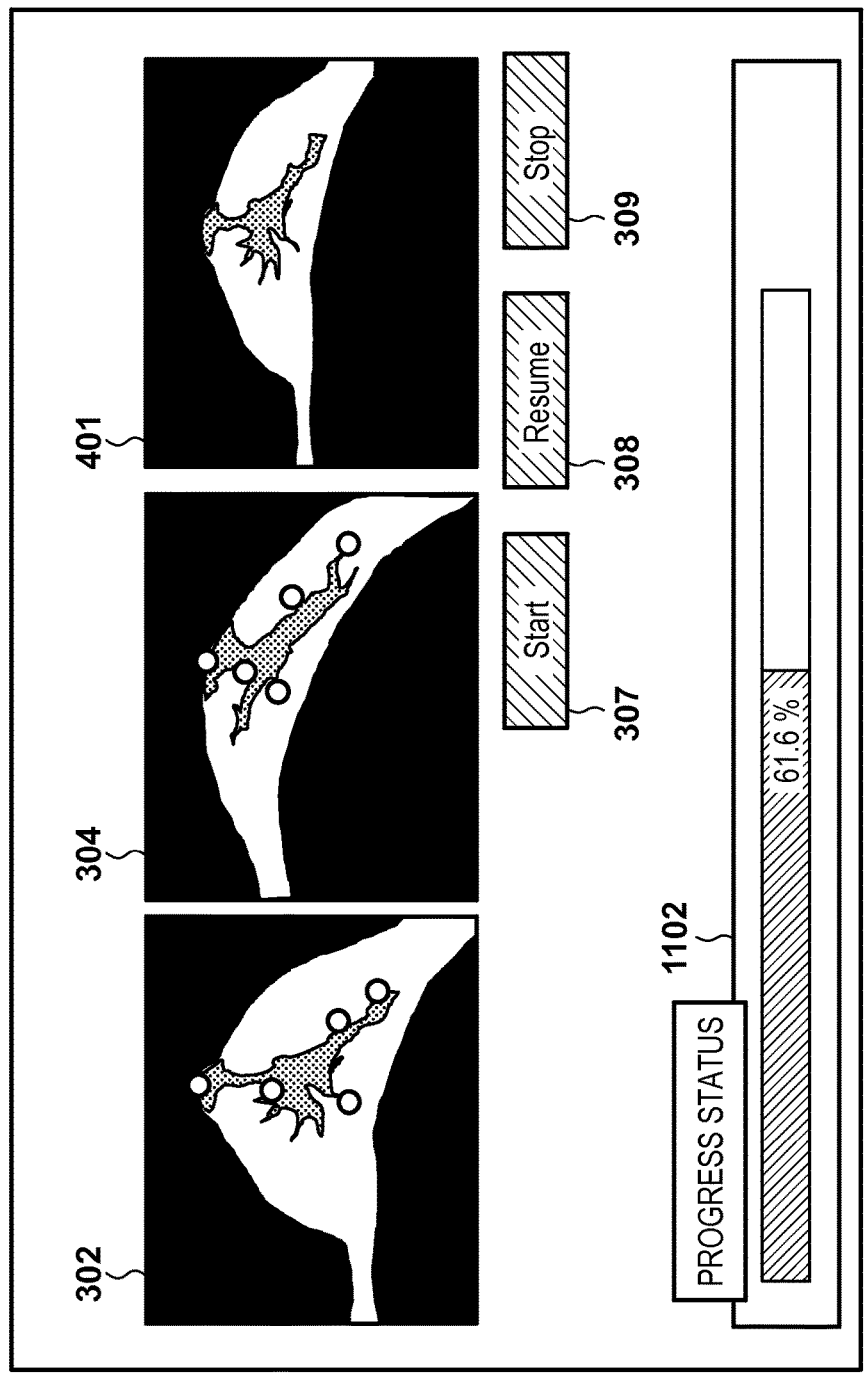
FIG. 11 is a view showing the screen arrangement of a display unit when a deformation state is displayed according to the fifth embodiment.

FIG. 11 is a view showing a display example including the progress status prediction result (progress information) in display of the deformation information shown in FIG. 4A described in the first embodiment. The progress status prediction result (progress information) calculated in step S904 is indicated using a progress status display unit 1102 (progress bar). FIG. 11 shows a case in which the progress status is 61.6% with respect to all the optimization steps. Note that the progress status display method shown in FIG. 11 is merely an example, and any display method may be used as long as the progress status is indicated. For example, a GUI designed in imitation of an analog clock may be used to display the progress status.

According to this embodiment, it is possible to quantitatively indicate information representing whether the current convergence status is at the initial stage or a status in which convergence is almost complete with respect to all the optimization steps. The user can determine whether to correct the corresponding points group based on this information.

According to each of the aforementioned embodiments, it is possible to reduce a waiting time to obtain a registration result.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-235890, filed Nov. 20, 2014, which is hereby incorporated by reference herein in its entirety.

What is claimed is:

1. An image processing apparatus comprising:
   one or more processors; and
   one or more memories storing instructions that, when executed by the one or more processors, cause the one or more processors to:
   obtain information on corresponding points group including two or more pairs of corresponding points for associating a position in a first image with a position in a second image different from the first image, wherein the first image and the second image are three-dimensional medical images;
   calculate deformation between the first image and the second image on the basis of the information on the corresponding points group by using a high-speed algorithm in which accuracy of calculation processing on deformation is lower than that of a low-speed algorithm and which is capable of executing the calculation processing at high speed;
   cause a deformation image to be displayed on the basis of the calculated deformation;
   modify the information on the corresponding points group in a coordinate system of the first image or the second image on the basis of information generated based on a designation of a user, wherein the information on the corresponding points group is modified by at least one of addition of new corresponding points, deletion of arbitrary corresponding points, or movement of positions of arbitrary corresponding points, in the coordinate system of the first image or the second image;
   in a case where the information is modified, calculate deformation on the basis of the modified information on the corresponding points group by using the high-speed algorithm; and
   in a case where the information is not modified, calculate deformation on the basis of the information on the corresponding points group by using the low-speed algorithm.

2. The apparatus according to claim 1, wherein
   during the modification of the corresponding points group information, calculation of the deformation is interrupted in accordance with an operation input for instructing to interrupt the calculation, and
   after completion of the modification, calculation of the deformation is restarted based on the modified corresponding points group information in accordance with an operation input for instructing to restart the interrupted calculation.

3. The apparatus according to claim 2, wherein the one or more memories further store instructions that, when executed by the one or more processors, cause the one or more processors to:
   obtain an instruction of a processing step to be traced back in the interrupted calculation,
   wherein after the processing step is instructed to be traced back and the modification of the corresponding points group information is completed, calculation of the deformation restarts from a processing step reached by tracing back the instructed processing step, based on the modified corresponding points group information.

4. The apparatus according to claim 1, wherein the one or more memories further store instructions that, when executed by the one or more processors, cause the one or more processors to:
   generate the deformation image by obtaining a calculation result indicating a halfway state of the deformation; and
   cause the generated deformation image to be displayed.

5. The apparatus according to claim 1, wherein the one or more memories further store instructions that, when executed by the one or more processors, cause the one or more processors to:
during modification of the corresponding points group information, perform the deformation calculation processing in a background.

6. The apparatus according to claim 5, wherein the one or more memories further store instructions that, when executed by the one or more processors, cause the one or more processors to:
during modification of the corresponding points group information, obtain and display deformation information indicating a halfway state of the deformation in the background.

7. The apparatus according to claim 5, wherein the one or more memories further store instructions that, when executed by the one or more processors, cause the one or more processors to:
during modification of the corresponding points group information, stop update of the display based on the obtained deformation information.

8. The apparatus according to claim 5, wherein the one or more memories further store instructions that, when executed by the one or more processors, cause the one or more processors to:
stop update of the display based on the obtained deformation information with respect to a partial region designated to modify the corresponding points group information;
obtain deformation information indicating a halfway state of the deformation with respect to a region other than the designated partial region; and
cause the deformation information to be displayed.

9. The apparatus according to claim 1, wherein the one or more memories further store instructions that, when executed by the one or more processors, cause the one or more processors to:
obtain the deformation image based on processing of the low-speed algorithm;
cause the deformation image to be displayed; and
in a case where the corresponding points group information is modified based on the display, calculate the deformation using the high-speed algorithm by setting a calculation result of the low-speed algorithm as an initial value.

10. The apparatus according to claim 1, wherein the one or more memories further store instructions that, when executed by the one or more processors, cause the one or more processors to:
obtain, as progress information, a ratio of the number of steps having undergone calculation processing to the total number of steps to be executed to calculate the deformation; and
cause the deformation image and the progress information to be displayed.

11. An image processing method comprising:
obtaining information on corresponding points group including two or more pairs of corresponding points for associating a position in a first image with a position in a second image different from the first image, wherein the first image and the second image are three-dimensional medical images;
calculating deformation between the first image and the second image on the basis of the information on the corresponding points group by using a high-speed algorithm in which accuracy of calculation processing on the deformation is lower than that of a low-speed algorithm and which is capable of executing the calculation processing at high speed;
causing a display unit to display a deformation image on the basis of the deformation calculated in the step of calculating;
modifying the information on the corresponding points group in a coordinate system of the first image or the second image on the basis of information generated based on a designation of a user, wherein the information on the corresponding points group is modified by at least one of addition of new corresponding points, deletion of arbitrary corresponding points, or movement of positions of arbitrary corresponding points, in the coordinate system of the first image or the second image;
in a case where the information is modified, calculating deformation on the basis of the modified information on the corresponding points group by using the high-speed algorithm; and
in a case where the information is not modified, calculating deformation on the basis of the information on the corresponding points group by using the low-speed algorithm.

12. A computer-readable storage medium storing a program for causing a computer to function as each unit of an image processing apparatus, the image processing apparatus comprising:
an obtaining unit configured to obtain information on corresponding points group including two or more pairs of corresponding points for associating a position in a first image with a position in a second image different from the first image, wherein the first image and the second image are three-dimensional medical images;
a calculation unit configured to calculate deformation between the first image and the second image on the basis of the information on the corresponding points group by using a high-speed algorithm in which accuracy of calculation processing on deformation is lower than that of a low-speed algorithm and which is capable of executing the calculation processing at high speed;
a display control unit configured to cause a display unit to display deformation image on the basis of the deformation calculated by the calculation unit; and
a modification unit configured to modify the information on the corresponding points group in a coordinate system of the first image or the second image on the basis of information generated based on a designation of a user,
wherein the information on the corresponding points group is modified by at least one of addition of new corresponding points, deletion of arbitrary corresponding points, or movement of positions of arbitrary corresponding points, in the coordinate system of the first image or the second image,
wherein in a case where the information is modified, the calculation unit is further configured to calculate deformation on the basis of the information on the corresponding points group modified by the modification unit by using the high-speed algorithm, and
wherein in a case where the information is not modified, the calculation unit is further configured to calculate deformation on the basis of the information on the corresponding points group by using the low-speed algorithm.

13. The apparatus according to claim 1, wherein the first image is an image captured in a first deformation state, and the second image is an image captured in a second deformation state different from the first deformation state.

14. The apparatus according to claim 1, wherein the one or more memories further store instructions that, when executed by the one or more processors, cause the one or more processors to:

cause information based on a distance error between the position in the first image and the position in the second image, which reflects deformation in a halfway state of calculation processing, to be displayed as the deformation image.

15. The apparatus according to claim 1, wherein the one or more memories further store instructions that, when executed by the one or more processors, cause the one or more processors to:

cause the first image and the second image to be displayed, on which the corresponding points group is superimposed, and cause the deformation image to be displayed.

16. The apparatus according to claim 1, wherein the one or more memories further store instructions that, when executed by the one or more processors, cause the one or more processors to:

cause a GUI to be displayed, wherein the GUI is capable of at least one of a start of the calculation, an interruption of the calculation, and restart of the calculation.

17. The apparatus according to claim 1, wherein the one or more memories further store instructions that, when executed by the one or more processors, cause the one or more processors to:

cause a GUI to be displayed, wherein the GUI is capable of at least one of the addition of new corresponding points, the deletion of arbitrary corresponding points, and the movement of positions of arbitrary corresponding points.

18. The apparatus according to claim 1, wherein the one or more memories further store instructions that, when executed by the one or more processors, cause the one or more processors to:

cause intermediate deformation information to be displayed, wherein the intermediate deformation information is information representing distance error of the corresponding points.

19. The apparatus according to claim 1, wherein the one or more memories further store instructions that, when executed by the-one or more processors, cause the one or more processors to:

cause intermediate deformation information to be displayed, wherein the intermediate deformation information is information representing a movement locus of an arbitrary position by the deformation.

* * * * *